United States Patent [19]

Geisow et al.

[11] 3,882,772
[45] May 13, 1975

[54] METHOD AND APPARATUS FOR IMPRESSING IDENTIFYING CHARACTERS INTO METAL BAR STOCK

[76] Inventors: Bernard H. Geisow, 443 Hollow Dr., Houston, Tex. 77024; Lamon Harrelson, 12125 Palm Springs, Houston, Tex. 77034

[22] Filed: Jan. 19, 1973

[21] Appl. No.: 325,145

[52] U.S. Cl. ............ 101/4; 83/163; 83/467
[51] Int. Cl. ............ B44b 5/00; B26d 3/16
[58] Field of Search ............ 101/3 R, 4, 9, 10, 11, 101/32, 247; 10/12 R, 26; 72/291, 275, 338; 83/467, 163; 74/520

[56] References Cited
UNITED STATES PATENTS

| | | | |
|---|---|---|---|
| 807,850 | 12/1905 | McCaffrey | 101/3 R |
| 2,229,226 | 1/1941 | Scott et al. | 101/152 |
| 2,690,121 | 9/1954 | Auerbacher et al. | 101/247 X |
| 3,039,344 | 6/1962 | Hercik | 83/467 |
| 3,067,674 | 12/1962 | Tyma, Jr. et al. | 101/247 X |
| 3,190,218 | 6/1965 | Willard | 101/182 X |

OTHER PUBLICATIONS
"Product Engineering," Annual Handbook of Product Design of 1953, pp. F26, 27, Pub. Date, Nov. 1952.

*Primary Examiner*—Edgar S. Burr
*Assistant Examiner*—Paul J. Hirsch

[57] ABSTRACT

In one exemplar embodiment, an apparatus for impressing identifying characters into the end face of metal bar stock is disclosed. A stamping apparatus operates in conjunction with conventional bar stock drawing and cutting machines. The stamping apparatus has a die positioning member adapted for pivotal movement carrying a character imprinting die that is extended and locked in the path of the moving bar stock. The force of the bar stock moving against the die imprints the identifying characters in the end face of the bar stock. Just prior to cutting of the bolt blank from the bar stock the cutting machine signals the bolt stamping apparatus and the die positioning member begins to pivot and retract into the apparatus housing thereby relieving the pressure between the end face of the bar stock and the die. The die positioning member continues to pivot into the housing as the cutting machine cuts the bolt blank from the bar stock and allows the bolt blank to fall free for collection. The bar stock is advanced again and the die positioned to repeat the imprinting process on the next bolt blank.

10 Claims, 8 Drawing Figures

METHOD AND APPARATUS FOR IMPRESSING IDENTIFYING CHARACTERS INTO METAL BAR STOCK

BACKGROUND OF THE INVENTION

This invention relates to apparatus and methods of imprinting identifying characters on the end face of metal bar stock. More precisely, this invention relates to the imprinting of identifying characters on the end face of bolt blanks.

As a safety measure, the American Society for Testing and Materials (ASTM) requires as a part of its standard that all bolts, stud and headed, carry identifying characters in order to identify the bolt manufacturer in the event of bolt failure. This requirement is part of the ASTM designation (ASTM) designation A193. Accordingly, all bolts manufactured to ASTM standards must carry the identifying characters. For headed bolts the characters can be imprinted in the head forging process, but in the manufacture of stud bolts, the characters have to be separately imprinted. Various methods are used to imprint the identifying characters. The characters can be hand stamped but this is slow and costly because of the labor involved. Some machines have been designed to take bolt blanks and impress the identifying characters on the bolt blanks in a separate operation. This is also costly, since a separate machine is needed to handle the bolt blanks and to stamp the characters thereon. Also involved is additional labor in operating a separate machine, loading and unloading the machine with bolt blanks prior to further processing.

Accordingly, one primary feature of the present invention is to provide means for impressing identifying characters on the end face of bolt blank bar stock before the bolt blank has been cut, thereby eliminating the need for a separate stamping operation.

Another feature of the present invention is to provide a method of impressing identifying characters on the end face of bolt blank bar stock prior to cutting the bolt blank that does not interfere with the cutting operation.

SUMMARY OF THE INVENTION

The present invention remedies the problems of the prior art by providing method and apparatus to impress identifying characters on the end face of bolt blank bar stock just prior to the cutting operation of forming a bolt blank.

In accordance with a principle of this invention, an apparatus for impressing identifying characters on the end face of advancing bolt blank bar stock as the bar stock is supplied to a cutting machine is provided, comprising: a die with selected identification characters thereon, positioning and locking means for positioning and locking said die in the axial path of travel of the advancing bar stock to allow the end face of said advancing bar stock to engage said locked die and exert continued pressure against the die, said pressure exerted by the bar stock being sufficient to impress said die characters into the end face, and switch means connected to the cutting machine for generating a single just prior to the time the cutting machine cuts the bar stock into a bolt blank said positioning and locking means receiving said signal and in response thereto unlocking said dig out of the axial path of the bar stock to relieve said pressure between the end face of the bar stock and said die after impression of the identifying characters on the end face just prior to the bar stock being cut into a bolt blank by the cutting machine.

In accordance with another principle of this invention, a method of impressing identifying characters on the end face of advancing bolt blank bar stock as the bar stock is supplied to a cutting machine is provided, the method comprising the steps of: positioning a die containing the identifying characters in the axial path of travel of the advancing bar stock, locking said die in said position in the path of travel of the advancing bar stock, engaging said locked die with the end face of said advancing bar stock, said end face of said bar stock exerting continued pressure against the die as the bar stock attempts to advance against said locked die, said pressure exerted by the end face of the bar stock being sufficient to impress said die characters into the end face, and unlocking said die and repositioning said die out of the axial path of travel of the bar stock to relieve said pressure between the end face of the bar stock and said die for allowing cutting of said bar stock into a bolt blank.

BRIEF DESCRIPTION OF THE DRAWINGS

In order that the manner in which the above recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope where the invention may admit to further equally effective embodiments.

In the drawings.

DETAILED DESCRIPTION OF THE PREFERRED EMBODIMENTS

Figure 1:
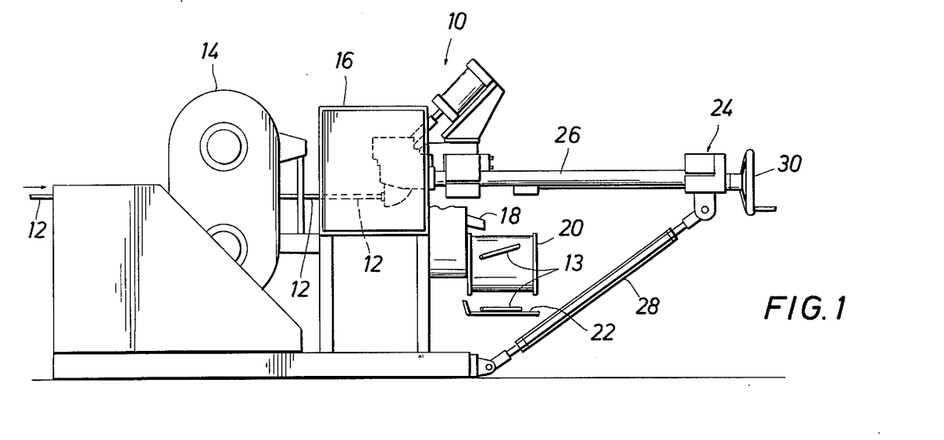
FIG. 1 is a side view of a bolt blank bar stock drawing and cutting machine with the bolt stamping apparatus in place.

Referring now to FIG. 1, a typical bolt blank bar stock drawing and cutting machine with a bolt stamping apparatus according to this invention is shown. The bolt stamping apparatus 10 for stamping selected identification characters on the end of the bolt blank cut from a solid bar stock 12 is shown. The apparatus 10 projects inwardly of an impact cutting machine 16 for cutting bolt blanks from the bar stock 12, the bar stock being fed to the cutting machine by a drawing machine 14. The drawing machine 14 and cutting machine 16 may be any conventional bar stock drawing and cutting machines.

Bolt stamping machine 10 is supported on a pair of parallel tubular members 26 mounted to and projecting from the end of the cutting machine 16. Tubular members 26 support the bolt stamping apparatus 10 which is movable thereon by means of a position adjusting means 24 operated by hand wheel 30. The position adjusting means is supported by a supporting means or bracket 28. The bolt blanks 13 after stamping and cutting are typically moved via discharge chute 18 onto a conveying means 20 where they are moved to a hopper or container 22 for collection for use in the next step of the bolt making operation.

Figures 2, 5:
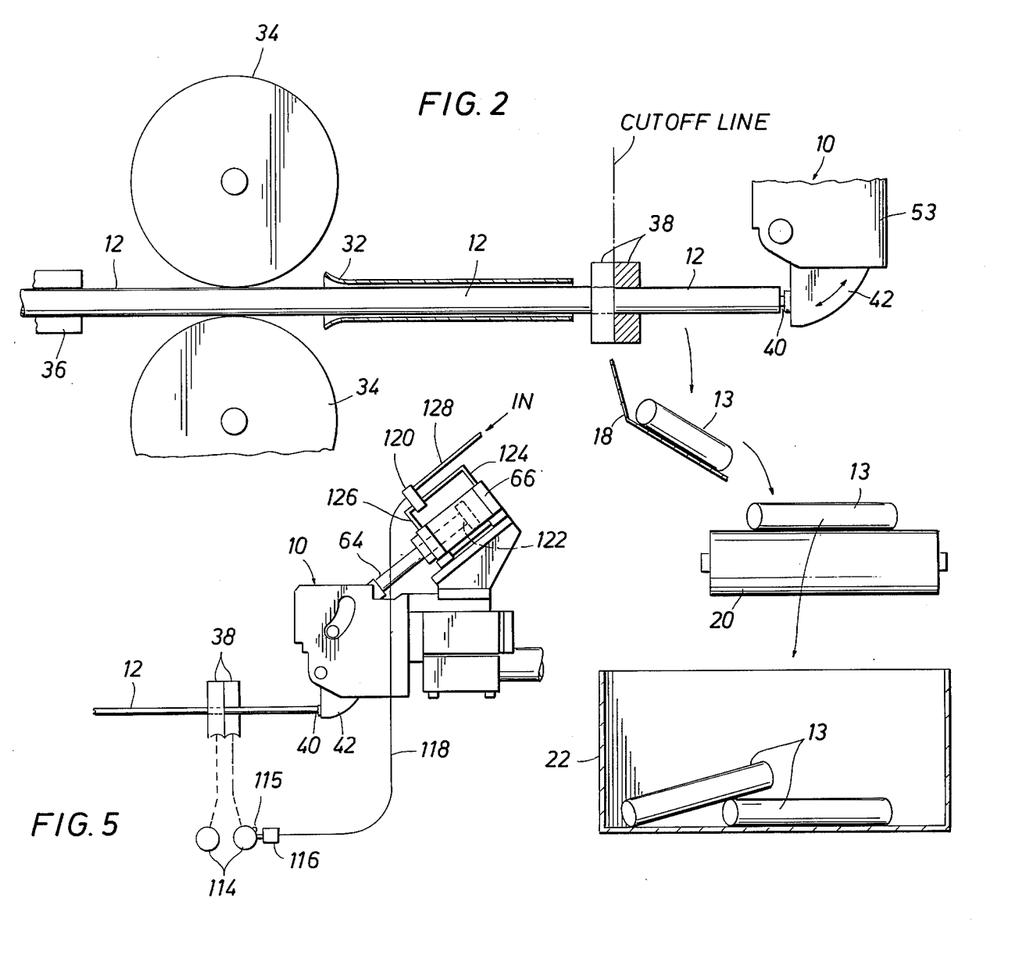
FIG. 2 is a simplified schematic diagram of the bolt blank bar stock drawing and cutting machine showing the bolt stamping apparatus engaging the bar stock.
FIG. 5 is a schematic diagram showing one embodiment of the cutting machine switch actuation for signaling the reciprocating means.

FIG. 2 illustrates in schematic form the operation of the bolt stamping machine 10 in conjunction with the drawing and cutting machines 14 and 16, respectively. The bar stock 12 is fed to feed rollers 34 by means of a hitch feed 36 where it is then passed through a guide tube 32 and enters the cutter heads 38. The bar stock continues through the cutting heads 38 until it contacts the character printing die 40 of bolt stamping apparatus 10. As the rollers and hitch feed continue to move the bar stock horizontally against the die head the pressure exerted by bar stock 12 against the die 40 is sufficient to impress the die characters into the end face of the bolt blank. The die 40 is carried by a die positioning member 42 adapted for pivotal movement about pivot pin 46 in the direction shown by the arrows. In FIG. 2, member 42 is shown in its extended and locked position allowing bar stock 12 to engage die 40. The bar stock exerts approximately 10,000 lbs. pressure against the locked die. After the characters have been imprinted on the end face of bar stock 12, and just prior to the cutting of the bar stock into a bolt blank 13, the cutting machine 16 signals (by conventional circuitry not shown) stamping apparatus 10 which unlocks die positioning member 42, and begins to retract member 42 into the housing 53 thus releasing the pressure applied by bar stock 12 on die 40. The cutters 38 then cut bar stock 12 into a bolt blank 13, along the "cut off line" shown, which falls away and is directed by chute 18 unto a conveyor 20 where the bolt blanks are carried to a container 22 for collection pending further disposition. The member 42 continues to retract into housing 53 to its open position. Immediately after cutters 38 cut bolt blank 13 from bar stock 12, member 42 is extended once again to position die 40 in the path of the advancing end face of bar stock 12. The whole process of stamping, cutting of the bolt blank, retraction and extension of member 42 is repeated for each new bolt blank cut.

Figure 3:
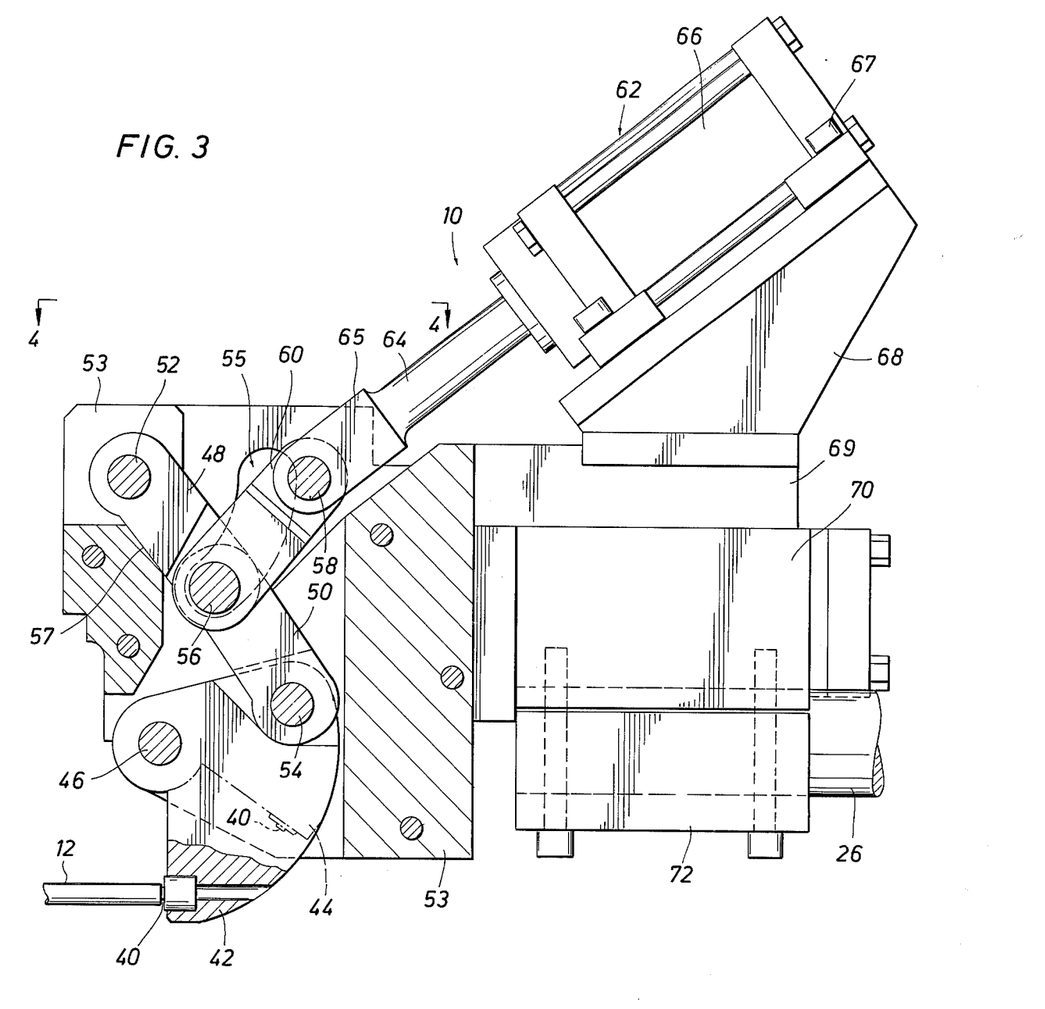
FIG. 3 is a fragmentary detailed side elevational view of one embodiment of the bolt stamping apparatus.
Figure 4:
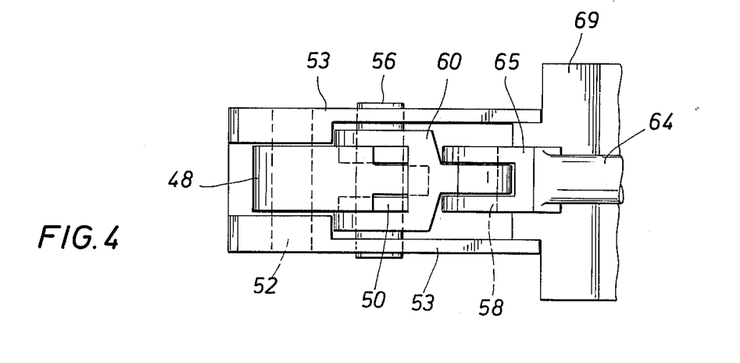
FIG. 4 is a top view of the embodiment of the bolt stamping apparatus shown in FIG. 3 and taken along lines 4—4.

FIGS. 3 and 4 illustrate the preferred embodiment of the bolt stamping apparatus. Die 40 with imprintable characters thereon is mounted on a die positioning member 42 shown in its down and locked position. The end of bar stock 12 is shown engaging die 40 to imprint the characters on the end face of the bar stock. Member 42 pivots about pivot pin 46 that is mounted between the two sections of the housing 53. The upper portion of the member 42 carries a link pin 54 which is attached to a first toggle link 50. A second toggle link 48 is shown pivoting about pivot pin 52 mounted in the housing 53 and is linked to the first toggle link 50 by means of a link pin 56. Link pin 56 projects through an arcuate slot 55 in the sides of the housing 53. Link pin 56 also carries a forked link 60 that is in turn attached by means of link pin 58 to the forked end 65 of a drive shaft 64 operated by a reciprocating means 62. Reciprocating means 62 may conveniently be a pneumatic, hydraulic or electro mechanical cylinder 66 appropriately mounted by means of bolts 67 to a reciprocating means support bracket 68. The support bracket 68 is carried by mounting assembly 69.

The reciprocating means 62 drives shaft 64 in a reciprocating motion upwardly and downwardly. The down stroke motion of drive shaft 64 drives forked link 60 downwardly, pivoting toggle links 48 and 50 downwardly and driving member 42 down into its extended position for allowing die 40 to engage the advancing bar stock 12. As the drive shaft 64 continues its downward movement, toggle link 48 swings down until it contacts stop shoulder 57. The stopping of toggle link 48 stops the downward travel of shaft 64 and positions toggle link 50 in its most downward position to extend member 42. With toggle link 48 abutting stop 57, the respective center lines of toggle links 48 and 50 are within a 3° angle of each other, effectively locking the toggle links in place about the axis of link pins 52, 54 and 56. It is this locked position which holds member 42 in its extended position to enable die 40 to engage the end of the advancing bar stock 12 and resist the pressure applied by the end face of bar stock 12 to imprint the die characters. Stop 57 also functions to stop the motion of toggle links 48 and 50 in order to hold member 42 in its fully extended position and not allow member 42 to begin to retract as would be the case if shaft 64 was allowed additional downward travel.

Just prior to the time that the cutters 38 (see FIG. 2) cut the bar stock 12, a switch associated with the cutter actuating mechanism (not shown) signals reciprocating means 62 and reciprocating means 62 causes drive shaft 64 to move upwardly thus unlocking toggle links 48 and 50 and pivoting die member 42 slightly upwardly, thereby releasing the pressure between the die 40 and the end face of bar stock 12. As soon as the die pressure has been released, the cutters 38 (see FIG. 2) cut the bar stock and form a bolt blank 13. But drive shaft 64 is simultaneously being moved upwardly and member 42 is pivoted upwardly into the housing 53 to its retracted position shown by the dotted lines at 44, allowing the bolt blank 13 to fall free (see FIGS. 1 and 2). As soon as the drive shaft 64 has moved upwardly its full motion, the reciprocating means returns drive shaft 64 down to its extended position thereby pivoting the die support member 42 into its extended and locked position. With member 42 in its extended position die 40 is again positioned in the path of the advancing bolt blank 12. The pressure exerted by the bolt blank 12 to impress the characters of the die into the bolt blank end face is repeated, as is the upward movement of member 42 to release the die stamping pressure on the end face of bar stock 12 and to pivot member 42 away from the bar stock to allow the bolt blank 13 to fall free after it is cut.

The signaling circuit for signaling the reciprocating means 62 just prior to the time that the cutters are to be actuated is not shown in FIGS. 3 and 4. However, the cutting apparatus can signal the reciprocating means in any conventional manner at a point in time just prior to the time that the cutting action is to take place. The signaling apparatus may be a micro switch closed by the cutting mechanism of machine 16 and a signal transmitted to a valve communicating with reciprocating means 62 to reverse the action of the drive shaft. This operation is continuously repeated for each bolt blank that is cut and stamped.

Support bracket 68 and mounting assembly 69 are carried by an upper bracket assembly 70 which is suitably connected to a lower bracket assembly 72 mounted on parallel tubular members 26 to allow horizontal positioning of apparatus 10 along tubular members 26 as will be hereinafter further described.

FIG. 5 is a schematic diagram showing the cutting machine actuation of a switch means for signaling the reciprocating means when the time has come to retract the die. Cutting heads 38 are shown mechanically driven by rotors 114. Bar stock 12 is in place against die 40 with the die positioning means 42 in its extended and locked position. One of the rotors 114 has been modified to include a cam 115 that will engage a micro switch 116 just prior to driving the cutting head 38 into cutting engagement with the bar stock. Switch 116 closes an electrical circuit via conductor 118 to actuate an electromechanical valve 120 that operates the piston 122 of hydraulic or pneumatic cyliner 66.

Compressed air or hydraulic fluid is applied to valve 120 via tubing 128. Valve 120 applies the compressed air or hydraulic fluid via tubing 126 or tubing 124 to cylinder 66 to drive piston 122 upwardly or downwardly. When switch 116 is actuated by cam 115, valve 120 applies compressed air or hydraulic fluid via tubing 126 to drive piston 122 and shaft 64 upwardly, thereby unlocking member 42 and relieving the applied pressure between the end face of bar stock 12 and die 40. As piston 122 continues upwardly, member 42 is retracted and cutters 38 cut the bolt blank from bar stock 12, and the bolt blank 13 (see FIG. 2) falls free for collection.

When piston 122 has reached its maximum upward travel, valve 120 switches back to allow compressed air or hydraulic fluid to pass via tubing 124 to drive piston 122 downwardly and lock member 42 in its extended position. Die 40 is positioned in the axial path of travel of bar stock 12 and the next character impressing operation takes place. Switch 116 and valve 120 are ready for the next actuation by rotor cam 115 to repeat the retraction of member 42.

Figure 6:
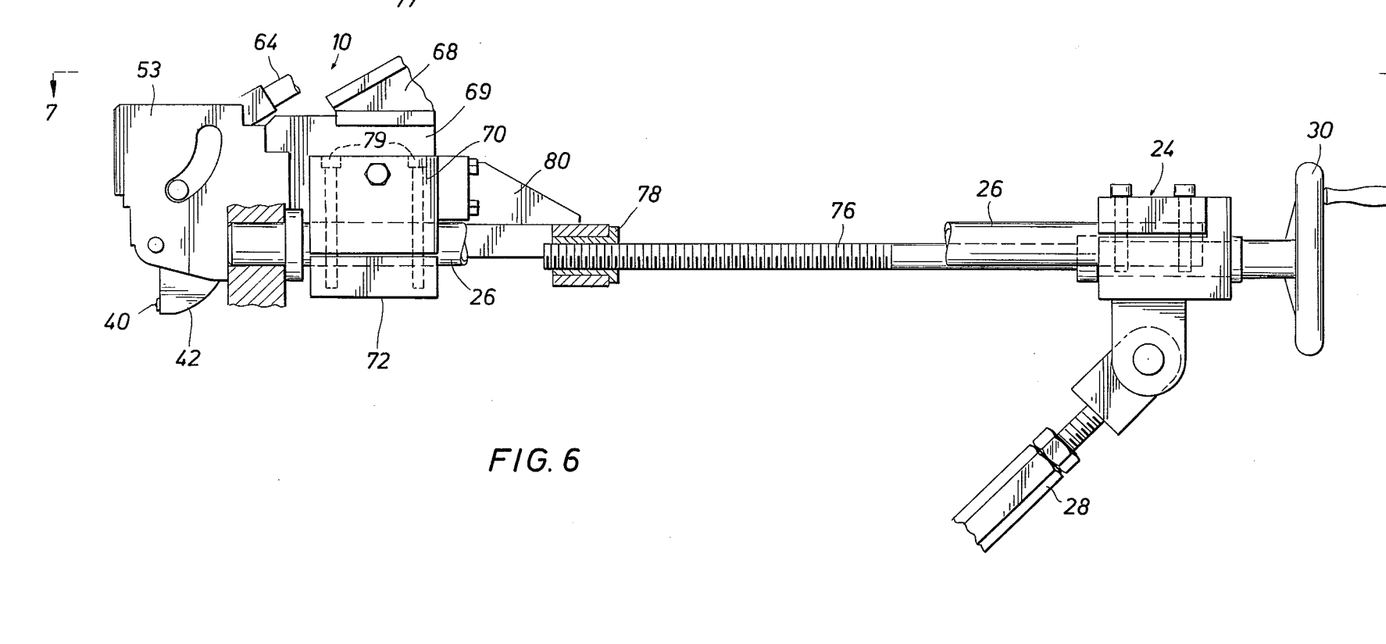
FIG. 6 is a side view of the bolt stamping apparatus including the position adjusting means.
Figure 7:
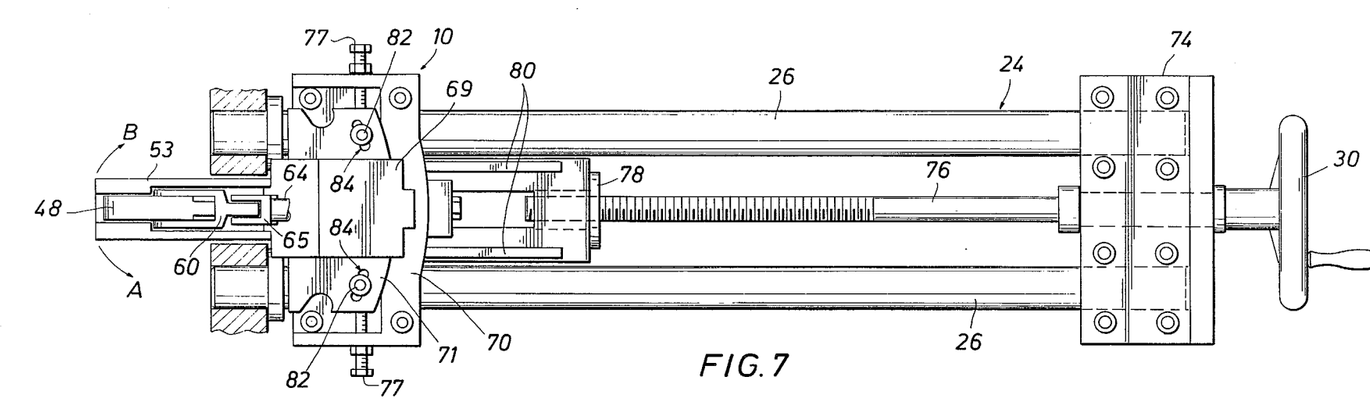
FIG. 7 is a top view of the bolt stamping apparatus including position adjusting means taken along line 7—7 of FIG. 6.

Referring now to FIGS. 1, 6 and 7, the horizontal position adjusting means 24 of stamping apparatus 110 is shown mounted on parallel tubular members 26 that extend horizontally from the cutting machine 16. Mounting assembly 69 is mounted on a sliding member 71 mounted within upper bracket assembly 70 and means are provided for allowing a small arcuate adjustment of the housing 53 in the horizontal plane as shown by arrows A and B. This adjustment allows for a slight adjustment in the plane of impact of die 40 with the end face of bar stock 12. The adjustment of housing 53 pivots about die 40 as a center point and can be canted 3° either side of center. The adjustment in the direction shown by arrows A and B may be accomplished by means of loosening bolts 82 and adjusting bolts 77 to move mounting assembly 69 arcuately in a horizontal plane. Bolts 82 move in slots 84. The above action laterally moves the plane of impact of die 40 to give the best and sharpest impression of the die characters into the end face of bar stock 12. Once die 40 is correctly positioned, then bolts 82 are again tightened as are bolts 77.

Mounted at the ends of tubular support members 26 is a bracket and guide assembly 74 that is attached to supporting means 28 which may conveniently be a bracket attached between bracket and guide assembly 74 and the floor or the base of the cutting machine as shown in FIG. 1. Bracket and guide assembly 74 carries a screw member 76 attached to a hand wheel 30 and engages a threaded member 78 attached by means supports 80 to the upper brackets assembly 70. As handwheel 30 is rotated, the screw member 76 threadedly engages the threaded member 78 and causes the threaded member 78, the attached upper bracket assembly 70 and mounting assembly 69 to move horizontally along tubular support members 26. Accordingly, for various lengths of bolt blanks desired, the bolt stamping apparatus 10 may be quickly and conveniently moved to a correct position to accommodate the correct bolt blank length that is to be cut from the advancing bar stock 12. Members 70 and 72 are allowed to move along support members 26 by loosening bolts 79. When correctly positioned, tightening bolts 79 lock members 70 and 72 to the support members 26.

Figure 8:
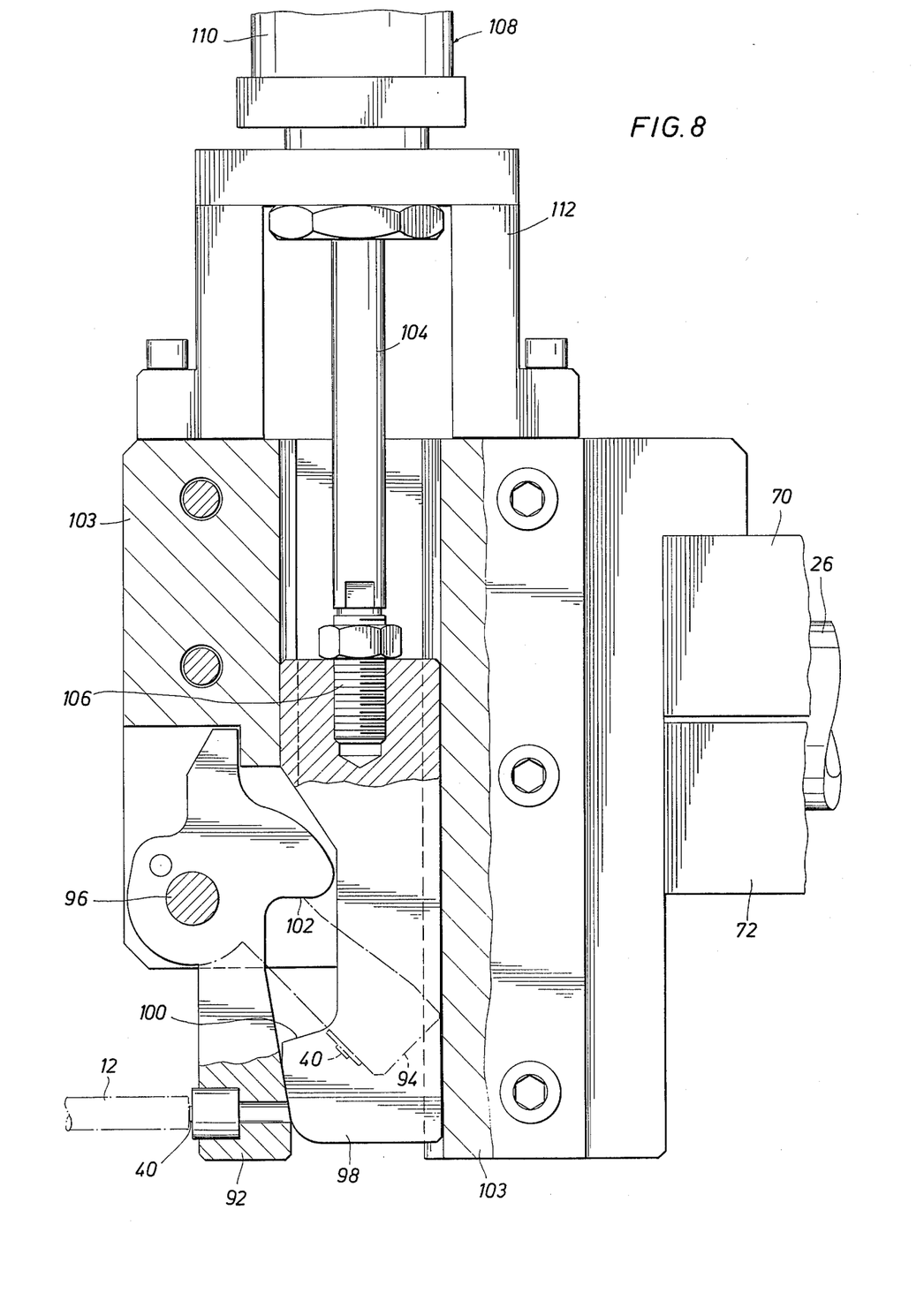
FIG. 8 is a fragmentary detailed side elevational view of a second embodiment of the bolt stamping apparatus.

FIG. 8 illustrates a second embodiment of the bolt stamping apparatus. In this embodiment, a die positioning member 92 carries a character impressing die 40 for engaging the end of bar stock 12. Member 92 pivots about a pivot pin 96. A sliding member 98 moves vertically within housing 103 and is shown in its downward position engaging and locking member 92 in place against the pressure exerted by the advancing bar stock 12. However, just before the cutters (see FIG. 2) cut bar stock 12 into a bolt blank, the reciprocating means 108 is signaled, as hereinbefore described, and the drive shaft 104 is moved upwardly unlocking member 92 and releasing the die impressing force between die 40 and the end of bar stock 12. At the same time as the bar stock is being cut into a bolt blank 13 as hereinabove described, the upwardly moving drive shaft 104 causes cam surface 100 of slide member 98 to engage the cam surface 102 of member 92 and pivots member 92 about pivot pin 96 to a retracted position as shown by the dotted lines at 94.

In the retracted position, member 92 removes die 40 from the path of bar stock 12 and allows the cut bolt blank to fall free for collection as hereinabove described. Drive shaft 104 may be suitably connected to sliding member 98 by means of a threaded portion 106. Reciprocating means 108 may of course be a conventional pneumatic or hydraulic cylinder mounted by means of mounting bracket 112 to the housing 103. Upper bracket 70 and lower bracket assembly 72 would conventionally mount housing 103 to the parallel tubular members 26 as hereinabove described.

Upon the downstroke of drive shaft 104, after the bolt blank has been cut, slide member 98 is driven downwardly thus allowing member 92 to pivot downwardly into its extended position and presenting die 40 to the advancing face of the bar stock 12. As drive shaft 104 continues downwardly it drives slide member 98 into locking engagement with member 92 thus locking the member in place and allowing the pressure exerted by the end face of bar stock 12 to impress the die characters into the end face. The sequence of locking member 92 in its extended position and unlocking and retracting the member from contact with the bar stock is repeated for each bolt blank that is to be stamped.

Numerous variations and modifications may obviously be made in this structure herein described without departing from the present invention. Accordingly, it should be clearly understood that the forms of the invention herein described and shown in the figures of the accompanying drawings are illustrative only and are not intended to limit the scope of the invention.

What is claimed is:

1. In combination with a bolt cutting machine, apparatus for impressing identifying characters on the end face of advancing bolt blank bar stock as the bar stock is supplied to said cutting machine, comprising
   a die with selected identification characters thereon,
   switch means connected to the cutting machine for generating a signal just prior to the time the cutting machine cuts the bar stock into a bolt blank,
   a housing disposed in fixed relation to said bolt cutting machine,
   a die positioning member supported by said housing, said die positioning member carrying said die and adapated for pivotal movement to position said die in the axial path of the advancing bar stock and to remove said die from the axial path of the bar stock,
   a reciprocating drive means having a drive shaft attached thereto, said reciprocating drive means having signal responsive control means connected to said switch means and operating said shaft in response to said signals from said switch means,
   toggle links being connected to said housing and to said die positioning member, said toggle links being connected to said drive shaft for positioning and locking said member and said die into the axial path of the advancing bar stock upon movement of said reciprocating drive means to a locking position thereof and unlocking and retracting said member to position said die out of the axial path of the bar stock upon movement of said reciprocating drive means to an unlocking position thereof, and
   said reciprocating drive means receiving said signal from said switch means and in response thereto moving to said unlocking position unlocking said die and repositioning said die out of the axial path of the bar stock to relieve said pressure between the end face of the bar stock and said die after impression of the identifying characters on the end face said movement of said reciprocating drive means to said unlocking position occuring just prior to the bar stock being cut into a blot blank by the cutting machine.

2. The apparatus as described in claim 1, wherein said pair of opposed toggle links is driven into locking alignment by the linear movement of said drive shaft of said reciprocating drive means in one direction thereof.

3. The apparatus as described in claim 1, wherein said reciprocating drive means comprises
   a pneumatic cylinder having an operating piston attached to said drive shaft, and
   said signal responsive control means being valve means responsive to said switch means for directing compressed air to said cylinder to control the reciprocating action of said drive shaft.

4. The apparatus as described in claim 1, wherein said reciprocating means comprises
   a hydraulic cylinder having an operating piston attached to said drive shaft, and
   said signal responsive control means being valve means responsive to said switch means for directing hydraulic fluid to said cylinder to control the reciprocating action of said drive shaft.

5. Apparatus for impressing identifying characters on the end face of advancing bolt blank bar stock as the stock is supplied to a cutting machine, comprising
   a housing fixed to the cutting machine,
   a die with selected identification characters thereon,
   a die positioning member carrying said die and adapted for pivotal movement into and out of said housing, said die positioning member movable out of said housing to position said die in the axial path of the advancing bar stock and movable into said housing to remove said die from the axial path of the bar stock,
   a reciprocating drive means mounted adjacent said housing for operating a drive shaft and having signal responsive control means for controlling operation of said drive means,
   toggle linkage means attached to said drive shaft and being pivotally connected to said die positioning member for pivoting said member into and out of said housing and locking said member with said die disposed in the path of travel of the advancing bar stock to allow the end face of said advancing bar stock to engage said locked die, said pressure exerted by the bar stock being sufficient to impress said die characters into the end face,
   shear means for cutting the bar stock into a bolt blank, said shear means having a pair of cutting heads and operating means to impart cutting movement to said cutting heads,
   switch means provided on said machine and being disposed for engagement with said operating means of said shear means for generating a signal just prior to the time the shear means cuts the bar stock into a bolt blank, said signal responsive control means of said reciprocating drive means being connected to said switch means and cooperating with said toggle linkage means responsive to receiving said signal to unlock said die positioning member and allow the die sufficient pivotal movement thereof to relieve said pressure between the end face of the bar stock and said die after impression of the identifying characters on the end face, but just prior to the bar stock being cut into a bolt blank by the cutting machine, and
   said reciprocating drive means further cooperating with said toggle linkage means and said die positioning member to retract said member into said housing for repositioning said die out of the axial path of the bar stock to allow the cut bolt blank to fall free for collection.

6. The apparatus as described in claim 5, wherein said reciprocating drive means comprises
   a pneumatic cylinder having an operating piston attached to said drive shaft, and
   valve means responsive to said switch means for directing compressed air to said cylinder to control the reciprocating action of said drive shaft.

7. The apparatus as described in claim 5, wherein said reciprocating drive means comprises
   a hydraulic cylinder having an operating piston attached to said drive shaft, and valve means reponsive to said switch means for directing hydraulic fluid to said cylinder to control the reciprocating action of said drive shaft.

8. The apparatus as described in claim 5, wherein said toggle linkage means comprises a pair of opposed toggle links disposed within said housing one end of each of which is connected to said drive shaft, the other end of one of said links connected to said die positioning member and the other end of the other of said links being connected to said housing, said pair of opposed toggle links being driven into locking alignment by the linear movement of said drive shaft in one direction thereof.

9. Apparatus for impressing identifying characters on the end face of advancing bolt blank bar stock as the bar stock is supplied to a cutting machine, comprising
    a housing fixed to the cutting machine, a die with selected identification characters thereon, a die positioning member carrying said die and adapted for pivotal movement into and out of said housing, said die positioning member movable out of said housing to position said die in the axial path of the advancing bar stock and movable into said housing to emove said die from the axial path of the bar stock,
    a reciprocating drive means mounted adjacent said housing for operating a drive shaft and having signal responsive control means for controlling operation of said drive means,
    toggle linkage means attached to said drive shaft and being pivotally connected to said die positioning member for pivoting said member into and out of said housing and locking said member with said die disposed in the path of travel of the advancing bar stock to allow the end face of said advancing bar stock to engage said locked die, said pressure exerted by the bar stock being sufficient to impress said die characters into the end face,
    shear means for cutting the bar stock into a bolt blank, said shear means having a pair of cutting heads and operating means to impart cutting movement to said cutting heads,
    switch means provided on said machine and being disposed for engagment with said operating means of said shear means for generating a signal just prior to the time the shear means cuts the bar stock into a bolt blank, said signal responsive control means of said reciprocating drive means being connected to said switch means and cooperating with said toggle linkage means responsive to receiving said signal to unlock said die positioning member and allow the die sufficient pivotal movement thereof to relieve said pressure between the end face of the bar stock and said die after impression of the identifying characters on the end face, but just prior to the bar stock being cut into a bolt blank by the cutting machine,
    said reciprocating drive means further cooperating with said toggle linkage means and said die positioning member to retract said member into said housing for repositioning said die out of the axial path of the bar stock to allow the cut bolt blank to fall free for collection, adjusting means attached to said housing for axially adjusting the postion of said die positioning member in its extended and locked position to accommodate bolt blanks of different lengths, said adjusting means having
    a pair of spaced parallel tubular members upon which said housing is slidably mounted,
    screw means extending between said parallel tubular members and engaging said housing for adjusting the position of said housing along said parallel tubular members, and
    support means supporting the ends of said parallel tubular members and said screw means.

10. Apparatus for impressing identifying characters on the end face of advancing bolt blank bar stock as the bar stock is supplied to a cutting machine, comprising
    a housing fixed to the cutting machine,
    a die with selected identification characters thereon,
    a die positioning member carrying said die and adapted for pivotal movement into and out of said housing, said die positioning member movable out of said housing to position said die in the axial path of the advancing bar stock and movable into said housing to remove said die from the axial path of the bar stock,
    a linear fluid motor mounted adjacent said housing and having a drive shaft driven thereby,
    a pair of opposed toggle links disposed within said housing one end of each of which is connected to said drive shaft, the other end of one of said links connected to said die positioning member and the other end of the other of said links connected to said housing, said links acting to cause pivotal movement of said die positioning member in response to linear movement of said drive shaft, said pair of opposed toggle links being driven into locking alignment by linear movement of said drive shaft in one direction thereof for locking said die positioning member in the path of travel of the advancing bar stock to allow the end face of said advancing bar stock to engage said locked die, said pressure exerted by the bar stock being sufficient to impress said die characters into the end face, and
    switch means being disposed for engagement with a movable part of said cutting machine and being automatically actuated by the cutting machine for generating a signal just prior to the time the cutting machine cuts the bar stock into a bolt blank, said reciprocating drive means having a signal responsive control means connected to said switch means and upon receiving said signal and causing said reciprocating drive means to drive said drive shaft in one linear direction thereof to unlock aid toggle links and retract said die positioning member into said housing after impression of the identifying characrers on the end face said retraction of said toggle links occurring just prior to the bar stock being cut into a bolt blank by the cutting machine.

* * * * *

UNITED STATES PATENT OFFICE
CERTIFICATE OF CORRECTION

PATENT NO. : 3,882,772
DATED : May 13, 1975
INVENTOR(S) : Bernard H. Geisow and Lamon Harrelson It is certified that error appears in the above-identified patent and that said Letters Patent are hereby corrected as shown below:

Col. 1, line 67, "dig" should read --die and repositioning said die--.
Col. 5, line 49, "110" should read --10--.
Col. 9, line 24, "emove" should read --remove--.

Signed and Sealed this ninth Day of September 1975

[SEAL]

Attest:

RUTH C. MASON
Attesting Officer

C. MARSHALL DANN
Commissioner of Patents and Trademarks